J. Linnemann,
Shovel,
Nº 83,071.        Patented Oct. 13, 1868.
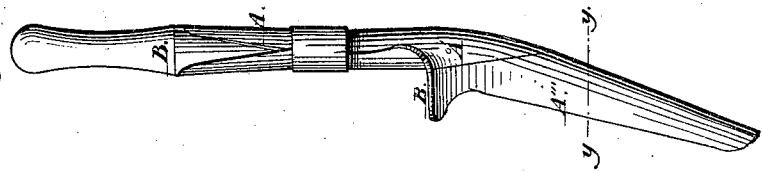
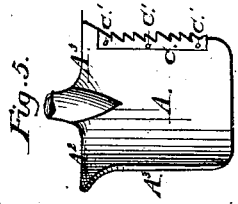
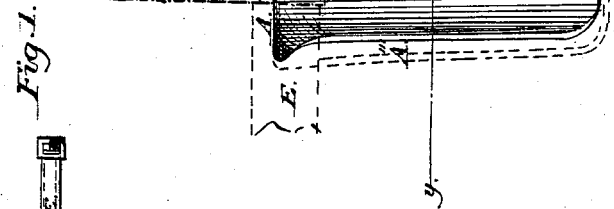
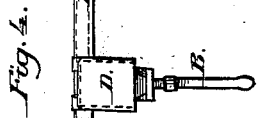
WITNESSES:
P. H. Sprague
Capt J. H. S. Miller
INVENTOR:
Johan Linnemann
per Chas. F. Clausen
his attorney.

United States Patent Office.

JOHAN LINNEMANN, OF COPENHAGEN, DENMARK.

Letters Patent No. 83,071, dated October 13, 1868.

IMPROVEMENT IN SPADES.

The Schedule referred to in these Letters Patent and making part of the same.

*To all whom it may concern:*

Be it known that I, JOHAN LINNEMANN, of the city of Copenhagen, in the Kingdom of Denmark, have invented a new and useful Improvement in Spades; and I do hereby declare the following to be a full, clear, and exact description of the same, reference being had to the annexed drawings, making a part of this specification, in which—

Figure 1 is a front view;
Figure 2 is a horizontal section on line $y\ y$;
Figure 3 is a side view; and
Figure 4 shows the manner in which the spade may be carried by travellers.
Figure 5 shows a saw-blade attached to the vertical edge of a spade.

The same letters of reference in all the figures denote identical parts.

The nature of my invention consists in constructing the blade of a spade in such a manner that it may serve as a knife, or axe, saw, frying-pan, or as a very formidable weapon of defense.

In order to adapt it to the use of the army, or for travellers, I construct the handle of the spade as short as will be convenient, and suspend the spade by a belt to be carried by the traveller.

To enable others skilled in the art to make and use my improvement, I will proceed to describe its construction and operation.

The blade of the spade A is of a rectangular form, its lower edges rounded, and, to add to its strength, the upper edge (where the operator plants his foot, in order to force the blade down in the ground) is bent backward, as shown in fig. 3, at $A^{ii}$.

The blade extends upward, and, in combination with a piece of sheet-metal, $A^i$, riveted to the back of the blade, forms a socket for the handle B.

Fig. 2 shows the concave form of the blade A; and the perpendicular sides of the spade may be either sharpened, so as to be used as a knife or axe, or teeth may be filed in the blade, to make it useful as a saw. Either one or both sides may be sharpened, or teeth cut in them, or one side, $A^{iii}$, may be sharpened and the other side, $A^{iv}$, provided with teeth.

The teeth may be cut in the blade itself, or cut in an adjustable piece of steel-plate, C, fastened to the blade by thumb-screws, C, as shown in fig. 5.

The handle B may be made so as to be adjustable, and, if found more convenient, it may be taken out of the socket of the spade and carried on the top of a knapsack, or in other convenient places.

When carried on a march, the spade is secured in a bag, D, or cover, fitting closely to the blade, and attached to a belt, E, or strap, and fastened round the waist or shoulder of the carrier, the hollow of the blade resting against the hip, and the spade hanging in a perpendicular position, with the handle downward, as shown in fig. 4.

As it is my main object to adapt my improved spade to the use of the army, or for travellers, I construct the spade-blade and handle as light as practicable—the blade of good hard steel, and the handle of light, flexible wood.

The sharp or serrated edge or edges of the blade will be found very useful to clear obstructions, and a spade, the blade of which is provided with such edges, will form a most effective weapon.

The concave form of the blade will allow it to be used as a frying-pan.

Having thus described my invention,
What I claim, and desire to secure by Letters Patent, is—

1. The blade of a spade, constructed with one or both of its vertical edges serrated, substantially as described.

2. In combination with the blade and handle-socket of a spade, a detachable handle, B, substantially as and for the purpose set forth.

JOHAN LINNEMANN.

Witnesses:
T. WOGENSEN,
J. G. F. COLDING.